United States Patent [19]

Yen et al.

[11] 4,124,501

[45] Nov. 7, 1978

[54] PURIFYING OIL SHALE RETORT WATER

[75] Inventors: Teh F. Yen, Altadena; John E. Findley, San Gabriel, both of Calif.

[73] Assignee: University of Southern California, Los Angeles, Calif.

[21] Appl. No.: 821,897

[22] Filed: Aug. 4, 1977

[51] Int. Cl.² .............................................. C02C 1/17
[52] U.S. Cl. ......................................... 210/16; 210/2; 210/11; 210/15; 195/2
[58] Field of Search ............. 195/2, 3 H, 3 R; 210/2, 210/11, 16

[56] References Cited

U.S. PATENT DOCUMENTS

| | | | |
|---|---|---|---|
| 1,701,825 | 2/1929 | Seil | 195/2 |
| 2,413,278 | 12/1946 | Zobell | 195/3 H |
| 2,574,070 | 11/1951 | Strawinski | 195/3 H |
| 2,660,550 | 11/1953 | Updegraff et al. | 195/3 H |
| 2,742,398 | 4/1956 | Zobell | 195/3 R |
| 2,975,103 | 3/1961 | Kirshenbaum | 195/3 H |
| 2,975,835 | 3/1961 | Bond | 166/246 |
| 3,020,205 | 2/1962 | Jensen | 195/2 |
| 3,032,472 | 5/1962 | Hitzman | 166/246 |
| 3,105,014 | 9/1963 | Harrison | 195/3 H |
| 3,118,500 | 1/1964 | Maddox et al. | 166/246 |
| 3,152,983 | 10/1964 | Davis et al. | 210/11 |
| 3,310,477 | 3/1967 | Wilke | 195/96 |
| 3,502,566 | 3/1970 | Raymond et al. | 210/11 |
| 3,542,431 | 11/1970 | Johnson et al. | 299/5 |
| 3,982,995 | 9/1976 | Yen et al. | 195/3 H |

*Primary Examiner*—Alvin E. Tanenholtz
*Attorney, Agent, or Firm*—Nilsson, Robbins, Dalgarn, Berliner, Carson & Wurst

[57] ABSTRACT

Anaerobic bacteria, e.g., of the Desulfovibrio family, are added to oil shale retort water producing an increase in cell biomass and reducing sulfate ions present to sulfide. The cell biomass is aggregated into a flocculent mass and removed. The sulfide can be oxidized and recycled to neutralize the retort water. Oxidation of sulfide to sulfate can be accomplished by addition of aerobic bacteria, e.g., of the Thiobacillus family.

33 Claims, 1 Drawing Figure

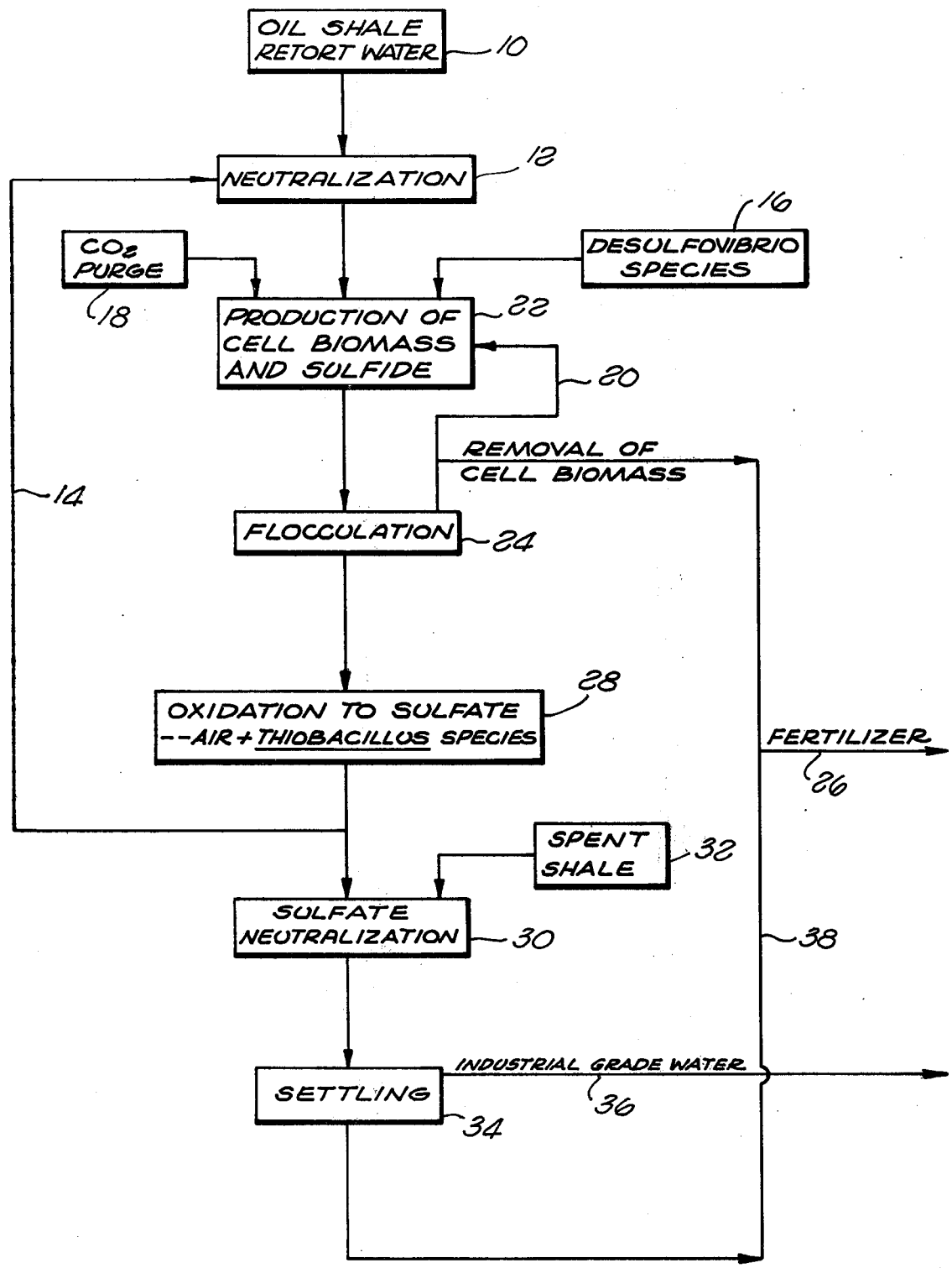

PURIFYING OIL SHALE RETORT WATER

FIELD OF THE INVENTION

The field of the invention includes the fields of oil shale retort water treatment and purification of substances by bacteriological action.

BACKGROUND AND SUMMARY OF THE INVENTION

Oil shale is a natural sedimentary rock containing an abundance of residual organic material which, when processed, can be made into oil and fuel products. Typically, oil shale, such as exemplified by the Green River formation in Wyoming, Colorado and Utah, has about 15-20% organic material embedded in an inorganic mineral matrix. The organic portion is composed generally of a soluble bitumen fraction in which kerogen constitutes the bulk of the insoluble organic material. In order to remove the organic material from the oil shale, the usual process has comprised crushing the matrix rock and subjecting the crushed matrix to heat in a retort to distill off the kerogen by destructive pyrolysis. A major waste product from oil shale retorting processes is water co-produced with the shale oil and which can also include a small amount of water originally trapped within the matrix of the oil shale. The amount of retort water formed may equal 20 to 100 barrels per 100 barrels of shale oil produced. Of course, the actual amount of retort water produced depends on the type of operating conditions of the retorting process as well as the location and nature of the oil shale.

Although water is produced as a result of retorting of the oil shale, in the production of oil from oil shale, a great deal of water is in fact used. For example, water is needed for fracturing during the mining operations and is used in kerogen concentration, in retorting, in upgrading the oil, in abatement procedures, etc. For each gallon of oil produced, about one gallon of water is needed with generally less water being required for in situ retorting processes as compared to above-ground processes. It would therefore be desirable to be able to utilize water formed from retorting for these production processes. However, the oil shale retort water is loaded with considerable quantities of soluble organic and inorganic materials not only preventing its utilization for production purposes, but also presenting a serious major disposable problem. Since economic feasibility is often called into question when one compares the cost of deriving useful oil products from oil shale, any basis for recovering of industrially usable water from the retort water constitutes a significant advantage.

A number of processes have been suggested for the treatment of retort water, including chemical precipitation, solvent extraction, ion exchange and limestone neutralization. Except for special circumstances, there are practical limitations in the applications of all the foregoing methods. Moreover, such methods generally require continued addition of treatment chemicals which increases the quantity of contaminants, complicates the problem of ultimate disposal, and decreases the opportunity for economic recovery.

The present invention provides a process for purifying oil shale retort water which does not suffer the drawbacks of the above-mentioned procedures. Specifically, the invention takes advantage of the fact that the oil shale retort water has a substantial amount of organic content and sufficient inorganic components, including sulfate, to enable the growth of anaerobic bacteria. Such bacteria, exemplified by the Desulfovibrio family, is added to the retort water so as to produce in the water a growth of cell biomass of the bacteria while simultaneously reducing sulfate ions to sulfide. Production of cell biomass should proceed substantially in the absence of air, preferably following purging with carbon dioxide, nitrogen or the like, to establish aerobiasis. The cell biomass is aggregated into a flocculent mass and is removed from the retort water.

The sulfide is oxidized to sulfate either through combustion processes or by conversion with air and aerobic bacteria, such as of the Thiobacillus family. At least a portion of the sulfate thus produced can be recycled to the retort water so as to neutralize the retort water prior to bacterial growth. Excess sulfate can be neutralized, for example, by reaction with spent shale, that is, by reaction with the inorganic matrix of retorted oil shale. The effluent discharge from this treatment yields a water quality which not only reduces environmental damage, but also supplements industrial water requirements of the mining and retorting operation. The reacted spent shale can be combined with the removed cell biomass and used as fertilizer. Alternatively, a portion, or all of the cell biomass, can be recycled to the retort water as nutrient for growth of the bacteria.

BRIEF DESCRIPTION OF THE DRAWING

The FIGURE is a flow diagram of the process conducted in accordance with the present invention.

DETAILED DESCRIPTION

Referring to the FIGURE, oil shale retort water 10 can be neutralized as indicated at 12 and by the line 14 by addition of sulfate obtained at a later stage of the process. The retort water is then innoculated with anaerobic bacteria such as Desulfovibrio spps. 16 and sparged with carbon dioxide 18 or other inert purge. Initially, the bacteria are acclimated to retort water, by known techniques. Cell biomass removed in a later stage of the process can be recycled for use during acclimation or can be added as additional nutrient, as indicated by the line 20. The bacteria utilize the organic content of the retort water for energy and as a carbon source and utilize sulfate contained in the retort water as well as ammonia, phosphate and trace metal nutrients to give rise to production of cell biomass and sulfide, as indicated at 22. The cell biomass can be removed by flocculation 24 with at least a portion of the removed cell biomass being recycled as above indicated. The remainder, if any, of the removed cell biomass can be combined with spent oil shale reacted at a later stage of the process, as described hereinafter to produce a material which has sufficient nutrient value to be useful as fertilizer 26.

Sulfide in the retort water is oxidized to sulfate, as indicated at 28 by any known combustion process. Alternatively, one can innoculate the retort water with aerobic bacteria such as Thiobacillus spps. and aerate the retort water with oxygen-containing gas, such as air, to oxidize the sulfide to sulfate. As previously indicated, a portion of the resultant sulfate can be recycled to neutralize the retort water. Excess sulfate can be neutralized as indicated at 30 by reaction with spent shale 32, i.e., the inorganic matrix of retorted oil shale. The mixture is led to a settling tank 34 wherein the reacted matrix is separated from the retort water, the overflow retort water being usable as industrial grade water 36 while the reacted matrix is combined, as indicated by the line 38, with excess cell biomass, if any, to produce fertilizer 26.

The composition of oil shale retort water will obviously vary depending upon diverse factors, including the nature of the shale and retort processing conditions. The organic components of oil shale retort water approximate that of Postgate's medium, a culture medium for bacteria, in which yeast extract and lactate are replaced by the fatty acid components of the retort water. As a general proposition, it is found that the solids content of oil shale retort water comprises about 67–75 weight percent inorganic components and about 25–33 weight percent organic components. Table I lists a typical range of values. Additionally, a small amount of phosphate will be present, generally less than 1 ppm calculated as phosphorous.

TABLE 1

| | | | |
|---|---|---|---|
| Inorganics 67–75 (%wt) | Cations 15–25 (%wt) | $Na^+$ | 4,500 ppm |
| | | $Mg^+$ | 250 ppm |
| | | $K^+$ | 180 ppm |
| | | $Ca^+$ | 120 ppm |
| | | $NH_4^+$ | 8,000 ppm |
| | | $HCO_3^-$ | 16,000 ppm |
| | | $CO_3^{--}$ | 5,000 ppm |
| | | $Cl^-$ | 5,000 ppm |
| | | $SO_4^{--}$ | 1,000 ppm |
| | Trace Metals | Pb, Zn, Cu, U, Cr, Fe, Mo, As, etc. | |
| Organics 25–33 (%wt) | Acidic Organics 10–15 (%wt) | Short-chain carboxylic acids $C_1 - C_{11}$ Long-chain carboxylic acids $C_{16} - C_{24}$ | |
| | Neutral Organics 3–5 (%wt) | Phenols Substituted Benzenes n-alkanes $C_{16} - C_{32}$ | |
| | Basic Organics 7–10 (%wt) | Nitrogen Base Organics, i.e., quinolines, pyridines, maleimides, succinimides, etc. Organic-Sulfur Compounds, i.e., thiophenes, sulfides, disulfides, etc. | |

The oil shale retort water has a pH of about 8.5 and sometimes higher. For growth of anaerobic bacteria, it may be necessary to decrease the alkalinity as bacteria such as *Desulfovibrio spps.* require neutral, or only slightly alkaline or slightly acidic, water to permit growth. Thus, a pH range of about 6.5-7.5 is preferred. Alkalinity of the retort water can be lowered by chemical reaction using added chemicals, but the present process scheme is particularly advantageous in providing a source of sulfate which can be recycled to the retort water to neutralize it prior to bacterial growth, indicated by the line 14 in the FIGURE. Such recycled neutralization facilitates a continuous process and one which is substantially closed-looped.

After neutralization, the retort water is inoculated with acclimated anaerobic bacteria, the vessel containing the retort water is sparged with carbon dioxide, or with nitrogen or other inert purge and is then closed sufficiently to preclude air. Particularly useful anaerobic bacteria are the *Desulfovibrio* family of bacteria, hereinafter referred to by the letter D. The members of the *Desulfovibrio* family which may be used for this purpose are *D. desulfuricans*, particularly the subspecii *aestuarii* and *desulfuricans*, D. africanus, D. gigas, D. salexigens, and *D. vulgaris*, particularly the subspecii *oxamicus* and *vulgaris*. A small amount of additional nutrient can be added. Such nutrient can be Postgate's medium or other known formulated nutrient, or can be the dead cells of *Thiobacillus* produced in a subsequent preferred step. The *Desulfovibrio* family of bacteria have the ability to thrive on their own dead cells so that it is convenient to recycle a portion of the flocculated cell biomass.

As above indicated growth of the cell biomass proceeds by utilization of the organic components of the oil shale retort water, exhausting those components and utilizing as well ammonia, phosphate and sulfate components of the retort water. The sulfate is used as an electron acceptor in the *Desulfovibrio's* metabolic processes and is converted to sulfide. As the cell biomass grows, it aggregates into a flocculent mass which can be removed by simply skimming from the vessel, yielding about 1.5 grams of cell biomass per 1000 grams of retort water.

Sulfide ions in the retort water are then oxidized and any known oxidation process can be utilized. In accordance with a preferred embodiment, the sulfide is oxidized by adding aerobic bacteria to the retort water and aerating with oxygen-containing gas, such as air. Of course, oxidation serves also to prevent further growth of the anaerobic bacteria. Particularly useful aerobic bacteria are the *Thiobacillus* family of bacteria, hereinafter referred to by the letter T. Members of the *Thiobacillus* family which may be used for this purpose are *T. thioxidans, T. concretivorous, T. sulfooxidans, T. ferrooxidans, T. thioparus, T. intermedius, T. novellus, T. thermitanus, T. umbonatus, T. lobatus, T. crenatus* and *T. neopolitans*.

Oxidation proceeds until all the sulfide is converted to sulfate yielding a retort water solution having a pH of about 5. As above indicated, a portion of the sulfated retort water can be recycled back to neutralize the initial influence of alkaline retort water. Remaining sulfate can be neutralized by chemical reaction, and it is convenient to use spent shale for this purpose. Shale which has been retorted consists of an inorganic mineral matrix composed primarily of carbonate materials, such as dolomite and calcite, quartz and silicate minerals, such as analcite or other zeolites, providing an effective reactant for neutralizing the sulfate content of the purified retort water. The *Thiobacillus spps.* does not flocculate, so that dead *Thiobacillus* cells agglomerate with the reacted shale matrix. The slurry of reacted spent shale, dead *Thiobacillus* cells, and retort water is delivered to a settling tank, whereupon after suitable time to permit settling, the overflow is removed to provide water of industrial grade, sufficiently pure to be used in the mining and retort processes associated with recovery of oil from oil shale.

Neutralization and inoculation of the oil shale retort water can take place in one vessel and the inoculated medium can be transferred to a second vessel in which flocculation, skimming to remove cell biomass and then oxidation to sulfate can all take place. The retort water is then delivered to a settling tank. By such means, a continuous process can be operated, but other arrangements can be used.

Since they self-perpetuate only small amounts of the *Desulfovibrio spps.* and *Thiobacillus* need be used, generally on the order of about 0.15 grams per liter of retort water. All of the bacterial species above referred to are readily available and can be obtained from the American Type Culture Collection (ATCC), as listed in the twelfth edition (1972) of that collection published by the American Type Culture Collection, Rockville, Maryland, or from the Natural Collection of Industrial Bacteria (NCIB), Aberdeen, Scotland. The following examples will further illustrate the invention.

EXAMPLE 1 — Growth of *Desulfovibrio spps.* Cell Biomass

A stock culture of *D. desulfuricans*, NCIB strain number 8399 was acclimated to progressively higher concentrations of retort water. A one percent (2.5 ml) inoculum from the stock was transferred into a 250 ml flask containing 90% Postgate's medium with lactate, adding NaCl (strain 83.99 is halophilic) and 10% retort water filtered through a 0.2 micron bacteriological filter. When growth was observed, transfer was made into 30% retort water media and thereafter the concentration of the retort water was increased 10% with each transfer according to the following schedule:

| Culture Medium | Time Incubated Before Transfer |
| --- | --- |
| stock | 1 day |
| 10% | 2 days |
| 30% | 6 days |
| 40% | 3 days |
| 50% | 7 days |
| 60% | 7 days |
| 70% | 8 days |
| 80% | 7 days |
| 90% | 6½ months |

The entire 8399 culture was then transferred to a fresh 90% medium which had been supplemented with $Na_2SO_4$ and $MgSO_4 \cdot 7H_2O$ in the same concentration as Postgate's medium. This flask was incubated for ½ weeks to provide a culture which can be added directly to neutralized retort water.

One liter of retort water can be placed in a vessel and neutralized to a pH of about 7. Carbon dioxide can be bubbled through the vessel and about 0.15 gram of the above culture can then be added and the vessel closed. A growth of cell biomass is formed over a period of about one week which aggregates into a flocculent mass. The cell biomass can be removed by skimming and air can be bubbled through the treated retort water to destroy the anaerobic bacteria.

EXAMPLE 2 — Oxidation With *Thiobacillus spps.*

*Thiobacillus* culture can be grown on a medium containing 2 grams of $(NH_4)_2SO_4$, 3 grams of $KH_2PO_4$, 0.5 gram of $MgSO_4 \cdot 7H_2O$, 0.25 gram of $CaCl_2 \cdot 2H_2O$ and one liter of distilled water. Ten grams of elemental sulfur can be layered on the surface of the medium which can thereafter be sterilized by intermittent steaming for 30 minutes on three consecutive days. A particular *Thiobacillus* species which can cultured is *T. thioxidans*, ATCC 8085, obtainable from the American Type Culture Collection.

As an inoculum for the treated retort water off Example 1, one can use 10 ml of a 7-day culture of the aboe *T. thioxidans* per liter of fresh medium maintained at room temperature without shaking in a 2.8 liter Fernbach flask. The *T. thioxidans* can be added while continuing aeration of the treated retort water of Example 1 for a period of two weeks. Thereafter the solution is neutralized by adding spent oil shale, the mixture is settled and industrially usable water is decanted off.

While the embodiments chosen herein for purposes of the disclosure are at present considered to be preferred, it is to be understood that this invention is intended to cover all changes and modifications which fall within the spirit or scope of the invention.

We claim:

1. A process for purifying oil shale retort water having a substantial amount of organic content, said retort water having sufficient inorganic components, including sulfate, to enable the growth of anaerobic bacteria, comprising:
    (a) lowering the alkalinity of said retort water to a pH in the range of about 6.5-7.5 and adding to said retort water anaerobic bacteria for reducing said sulfate to sulfide, said bacteria being capable of growth by utilizing said organic content;
    (b) producing in said retort water under anaerobic conditions a growth of cell biomass of said bacteria aggregated into a flocculent mass, and reducing said sulfate to sulfide; and thereafter
    (c) removing said aggregated cell biomass from said retort water; and
    (d) oxidizing said sulfide to sulfate.

2. The process of claim 1 in which said sulfide is oxidized to sulfate after said cell biomass has been removed from said retort water.

3. The process of claim 1 in which said alkalinity is lowered by recycling at least part of the sulfate from step (d) to said retort water.

4. The process of claim 1 including the step of neutralizing at least part of the sulfate product in step (d).

5. The process of claim 4 in which sulfate in said retort water is neutralized by reaction with the inorganic matrix of retorted oil shale.

6. The process of claim 5 including the step of separating said reacted matrix from said retort water.

7. The process of claim 1 in which step (d) comprises adding to said retort water aerobic bacteria capable of oxidizing said sulfide to sulfate, and aerating said retort water with oxygen-containing gas to effect said oxidation.

8. The process of claim 9 in which said oxygen-containing gas is air.

9. The process of claim 1 in which at least part of the cell biomass from step (c) is recycled to said retort water prior to step (c) as nutrient for growth of said bacteria.

10. The process of claim 1 in which said anaerobic bacteria are members of the Desulfovibrio family of bacteria.

11. The process of claim 10 in which said anaerobic bacteria are Desulfovibrio desulfuricans.

12. The process of claim 11 in which said anaerobic bacteria are subspecies *aestuarii*.

13. The process of claim 11 in which said anaerobic bacteria are subspecies desulfuricans.

14. The process of claim 10 in which said anaerobic bacteria are *Desulfovibrio africanus*.

15. The process of claim 10 in which said anaerobic bacteria are *Desulfovibrio gigas*.

16. The process of claim 10 in which said anaerobic bacteria are *Desulfovibrio salexigens*.

17. The process of claim 10 in which said anaerobic bacteria are *Desulfovibrio vulgaris*.

18. The process of claim 17 in which said anaerobic bacteria are subspecies oxamicus.

19. The process of claim 17 in which said anaerobic bacteria are subspecies vulgaris.

20. The process of claim 7 in which said aerobic bacteria are members of the Thiobacillus family of bacteria.

21. The process of claim 7 in which said aerobic bacteria are *Thiobacillus thioxidans*.

22. The process of claim 9 in which said aerobic bacteria are Thiobacillus concretivorous.

23. The process of claim 7 in which said aerobic bacteria are *Thiobacillus sulfooxidans*.

24. The process of claim 7 in which said aerobic bacteria are *Thiobacillus ferroxidans*.

25. The process of claim 7 in which said aerobic bacteria are *Thiobacillus thioparus*.

26. The process of claim 7 in which said aerobic bacteria are *Thiobacillus intermedius*.

27. The process of claim 7 in which said aerobic bacteria are *Thiobacillus novellus*.

28. The process of claim 7 in which said aerobic bacteria are *Thiobacillus thermitanus*.

29. The process of claim 7 in which said aerobic bacteria are *Thiobacillus umbonatus*.

30. The process of claim 7 in which said aerobic bacteria are *Thiobacillus lobatus*.

31. The process of claim 7 in which said aerobic bacteria are *Thiobacillus crenatus*.

32. The process of claim 7 in which said aerobic bacteria are *Thiobacillus neopolitans*.

33. A process for purifying oil shale retort water having a substantial amount of organic content, said retort water having sufficient inorganic components, including sulfate, to enable the growth of anaerobic bacteria, comprising:
 (a) adding to said retort water bacteria of the Desulfovibrio family of bacteria capable of growth by utilizing said organic content;
 (b) producing in said retort water under anaerobic conditions a growth of cell biomass of said bacteria aggregated into a fluocculent mass, and reducing said sulfate to sulfide; and thereafter
 (c) removing said aggregated cell biomass from said retort water;
 (d) adding to said retort water after step (c) bacteria of the Thiobaccillus family of bacteria and aerating said retort water with oxygen-containing gas to oxidize said sulfide to sulfate; and
 ((e) recycling at least part of the sulfate from step (d) to said retort water prior to step (b) in an amount sufficient to neutralize said retort water to a pH in the range of about 6.7–7.5.

* * * * *

UNITED STATES PATENT AND TRADEMARK OFFICE
CERTIFICATE OF CORRECTION

PATENT NO. : 4,124,501

DATED : November 7, 1978

INVENTOR(S) : Teh F. Yen and John E. Findley

It is certified that error appears in the above-identified patent and that said Letters Patent are hereby corrected as shown below:

Column 5, line 28, change "1/2" to --3-1/2--.

Column 6, line 35, change "9" to --7--.

Column 6, line 67, change "9" to --7--.

Signed and Sealed this

Third Day of April 1979

[SEAL]

Attest:

RUTH C. MASON
Attesting Officer

DONALD W. BANNER
Commissioner of Patents and Trademarks